US012576925B2

(12) United States Patent
Kwon et al.

(10) Patent No.: US 12,576,925 B2
(45) Date of Patent: Mar. 17, 2026

(54) FLAP AUTOMATICALLY-LOCKING ACTIVE AIR FLAP APPARATUS FOR VEHICLE

(71) Applicants: Hyundai Motor Company, Seoul (KR); Kia Corporation, Seoul (KR); Hanon Systems, Daejeon (KR)

(72) Inventors: Woo-Jae Kwon, Suwon-Si (KR); Ji-Eun Yang, Wonju-Si (KR); Sung-Wook Park, Daejeon (KR); Ok-Ryul Min, Daejeon (KR)

(73) Assignees: Hyundai Motor Company, Seoul (KR); Kia Corporation, Seoul (KR); Hanon Systems, Daejeon (KR)

( * ) Notice: Subject to any disclaimer, the term of this patent is extended or adjusted under 35 U.S.C. 154(b) by 361 days.

(21) Appl. No.: 18/230,485

(22) Filed: Aug. 4, 2023

(65) Prior Publication Data

US 2024/0317329 A1      Sep. 26, 2024

(30) Foreign Application Priority Data

Mar. 20, 2023     (KR) ........................ 10-2023-0035742

(51) Int. Cl.
B62D 35/00          (2006.01)
B60K 11/08          (2006.01)
(52) U.S. Cl.
CPC .......... B62D 35/005 (2013.01); B60K 11/085 (2013.01)
(58) Field of Classification Search
CPC ....... B60K 11/04; B60K 11/08; B60K 11/085; B62D 35/005

USPC ............................................ 296/180.1, 180.3
See application file for complete search history.

(56) References Cited

U.S. PATENT DOCUMENTS

| | | | | |
|---|---|---|---|---|
| 9,956,998 B2 * | 5/2018 | Zielinski | ................ | B62D 35/02 |
| 10,377,428 B2 * | 8/2019 | Povinelli | ................ | B62D 35/02 |
| 11,560,048 B2 * | 1/2023 | Kim | ..................... | B60K 11/085 |
| 2023/0182563 A1 * | 6/2023 | Jeong | ................... | B60K 11/085 |
| | | | | 180/68.1 |

FOREIGN PATENT DOCUMENTS

KR      10-2021-0056601 A      5/2021

* cited by examiner

*Primary Examiner* — Jason S Daniels
(74) *Attorney, Agent, or Firm* — MORGAN, LEWIS & BOCKIUS LLP

(57) ABSTRACT

A flap automatically-locking active air flap apparatus for a vehicle, includes a four-link mechanism that connects a driveshaft rotated by an actuator and a rotation shaft which separated from the driveshaft and about which the flap is rotated. Force of a traveling wind of a vehicle that rotates the flap and force of an actuator that locks the flap are set to be exerted in different directions when a four-link mechanism closes the flap. Thus, auto-locking is realized in a force equilibrium state. Accordingly, the flap is prevented from being open although the traveling wind of the vehicle applies a wind pressure to the flap. With a function of automatically locking the flap, the actuator producing a same output as an actuator in the related art is used without employing a separate structure, such as a stopper.

17 Claims, 5 Drawing Sheets

WIND IN DIRECTION OPPOSITE TO TRAVELING DIRECTION OF VEHICLE(P)

IT IS IMPOSSIBLE TO FORCE FLAP TO BE OPEN

FLAP AUTOMATICALLY-LOCKING ACTIVE AIR FLAP APPARATUS FOR VEHICLE

CROSS-REFERENCE TO RELATED APPLICATION

The present application claims priority to Korean Patent Application No. 10-2023-0035742, filed on Mar. 20, 2023, the entire contents of which is incorporated herein for all purposes by this reference.

BACKGROUND OF THE PRESENT DISCLOSURE

Field of the Present Disclosure

The present disclosure relates to an air flap apparatus for a vehicle, and more particularly, to a flap automatically-locking active air flap apparatus which is capable of preventing a flap from being forced to be open although a traveling wind as defined a wind in a direction opposite to a traveling direction of the vehicle applies a wind pressure to the flap.

Description of Related Art

Usually, an active air flap (hereinafter referred to as an AAF) apparatus controls an amount of air inflow (a traveling wind) into an engine compartment depending on the speed of the vehicle, and thus selectively allows the traveling wind to flow into the engine compartment.

To the present end, the AAF apparatus performs decreasing resistance to a traveling vehicle due to the amount of air inflow by blocking air from flowing into a radiator or a bumper grill when a temperature of a coolant reaches an appropriate temperature or below while the vehicle travels. Thus, the AAF apparatus improves fuel efficiency of the vehicle.

As an example, the AAF apparatus includes a flap opening a space in a housing, one actuator generating motive power, an AAF controller controlling the actuator to open or close the flap according to one of a vehicle speed, the temperature of the coolant, pressure of an air conditioner, and the like.

Furthermore, the flap is divided into a lower flap that occupies a lower portion (that is, the lower flap is positioned in the lower space) and an upper flap that occupies an upper portion (that is, the upper flap is positioned in the upper space), respectively, of the space in the housing. The lower flap includes a driveshaft connected to the actuator positioned on one side of the housing. The upper flap is connected to the driveshaft using two links and thus operates in conjunction with a motion of the lower flap due to rotation of the driveshaft. In the instant case, the actuator is a motor.

The lower flap is connected to the actuator through the driveshaft on one side (for example, on the left or right side) of the housing and is locked by receiving force from the actuator. Thus, although air resistance due to resistance of the actuator occurs while the vehicle travels, the flap may be kept locked (that is, kept full closed).

Therefore, the AAF apparatus can prevent the flap from being open although the traveling wind applies a wind pressure to a surface of the flap when the vehicle travels while the flap is kept full closed (that is, the flap does not operate).

However, in the above-described AAF apparatus, the actuator is used to lock the flap. Thus, one end portion (for example, the left side of the housing) of the flap (that is, the lower flap) is set to be a locking section and remains fixed by receiving force from the actuator. However, the other end portion (for example, the right side of the actuator) of the flap is set to be a free section and is in a state of being simply inserted into the housing without the actuator.

As a result, the flap includes the shape of a rectangle with a large width. The flap is divided into the stationary section, a middle section, and the free section in the longitudinal direction thereof. The actuator is not present on the middle section and the free section while the actuator is present on the stationary section. Thus, the middle section and the free section are positioned at a long horizontal distance in the actuator and thus do not receive force from the actuator. However, the middle section and the free section do not include a separate locking structure and thus may be only readily rotated due to the air resistance.

That is, high air resistance occurs on the flap that corresponds to the center portion of the vehicle. However, the middle section of the flap neither receive force from the actuator, nor include a fixation portion. Because of this, a phenomenon where the flap is pushed backward, warping the flap (that is, the lower flap).

The AAF apparatus sets a binding force of the actuator to about 10 kgf under the condition that the vehicle travels at a high speed. Therefore, in a case where the wind pressure exceeds the binding force, the flap is only forced to be open.

Furthermore, in recent years, the size of an AAF (that is, the size of the flap) has been increased because a large-sized grill is provided on a lower end portion of a bumper. Thus, the influence of the traveling wind of the vehicle has been increased. Consequently, the flap opening problem is further worsened when the vehicle travels at a high speed.

The flap opening problem may be solved by use of an actuator that produces a relatively high output. Thus, the manufacturing cost of the AAF apparatus and the weight thereof may be only increased.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a flap automatically-locking active air flap apparatus for a vehicle. The apparatus is configured for preventing a flap from being open although a traveling wind as defined a wind in a direction opposite to a traveling direction of the vehicle applies a wind pressure to the flap. The apparatus is configured for performing automatically locking the flap in a state where a four-link mechanism connecting a rotation shaft and a driveshaft that are structurally separated from each other keeps the flap closed. In the apparatus, an actuator locks the flap by rotating four links with respect to each other, in a direction opposite to a direction in which the flap is rotated by the traveling wind of the vehicle. In the apparatus, the actuator producing a same output as an actuator in the related art is used without employing a separate structure, such as a stopper. Thus, it is possible that the manufacturing cost of the apparatus and the weight thereof are decreased.

To accomplish the above-mentioned object, according to an aspect of the present disclosure, there is provided an active air flap apparatus including: a four-link mechanism for closing and opening a flap positioned in a flap space in a housing: a driveshaft coupled to the four-link mechanism and configured to be rotated to operate the four-link mechanism; and a rotation shaft coupled to the four-link mechanism and about which the flap is rotated, wherein the driveshaft and the rotation shaft are separated from each other and are connected to the four-link mechanism and the flap.

In the active air flap apparatus, the driveshaft may be positioned at a greater height from a reference surface of the housing than the rotation shaft, and the driveshaft may be positioned farther from the flap than the rotation shaft.

In the active air flap apparatus, the four-link mechanism may include: a first link; a second link: a third link; and a fourth link, wherein the first link, the second link, the third link: the fourth link may be positioned between the flap and the driveshaft.

In the active air flap apparatus, the flap may be closed when a point at which the second link and the third link intersect is on a line that connects a point where the first link and the second link intersect and the driveshaft, force of a traveling wind of a vehicle that rotates the flap and force that locks the flap may be exerted, in opposite directions, on the second link and the third link, respectively, maintaining a force equilibrium state, when the second link and the third link are on a straight line with each other, and in the force equilibrium state, auto-locking may keep the flap locked.

In the active air flap apparatus, the second link and the third link may make an angle of less than 5° with each other.

In the active air flap apparatus, the second link may be connected to an upper portion of the flap, the third link may be connected to the driveshaft, and the second link may be rotated inward about a hinge pin that connects the second link and the third link.

In the active air flap apparatus, the first link may be connected to the second link, the fourth link may be connected to the third link, the flap is configured as the first link, and the housing is configured as the fourth link.

In the active air flap apparatus, the driveshaft may be connected to the actuator, and the actuator may be positioned on one side of the housing and may be connected to the driveshaft on the opposite side thereof.

The flap automatically-locking active air flap apparatus for a vehicle according to an exemplary embodiment of the present disclosure that utilizes the four-link mechanism including a simple structure provides the following advantageous effects. Firstly, the problem that the flap of the AAF apparatus is forced to be open due to the traveling wind of the vehicle in a state where the flap is kept closed may be solved. Secondly, the flap can operate properly although a motor torque of the actuator that operates the flap, with the driveshaft and the rotation shaft of the AAF apparatus being separated from each other, is not increased. Thirdly, there is no need to use a separate mechanism that prevents the flap from being forced to be open due to the traveling wind of the vehicle. Thus, the manufacturing cost of the AAF apparatus and the weight thereof may be decreased when compared with the case where the separate mechanism is used.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
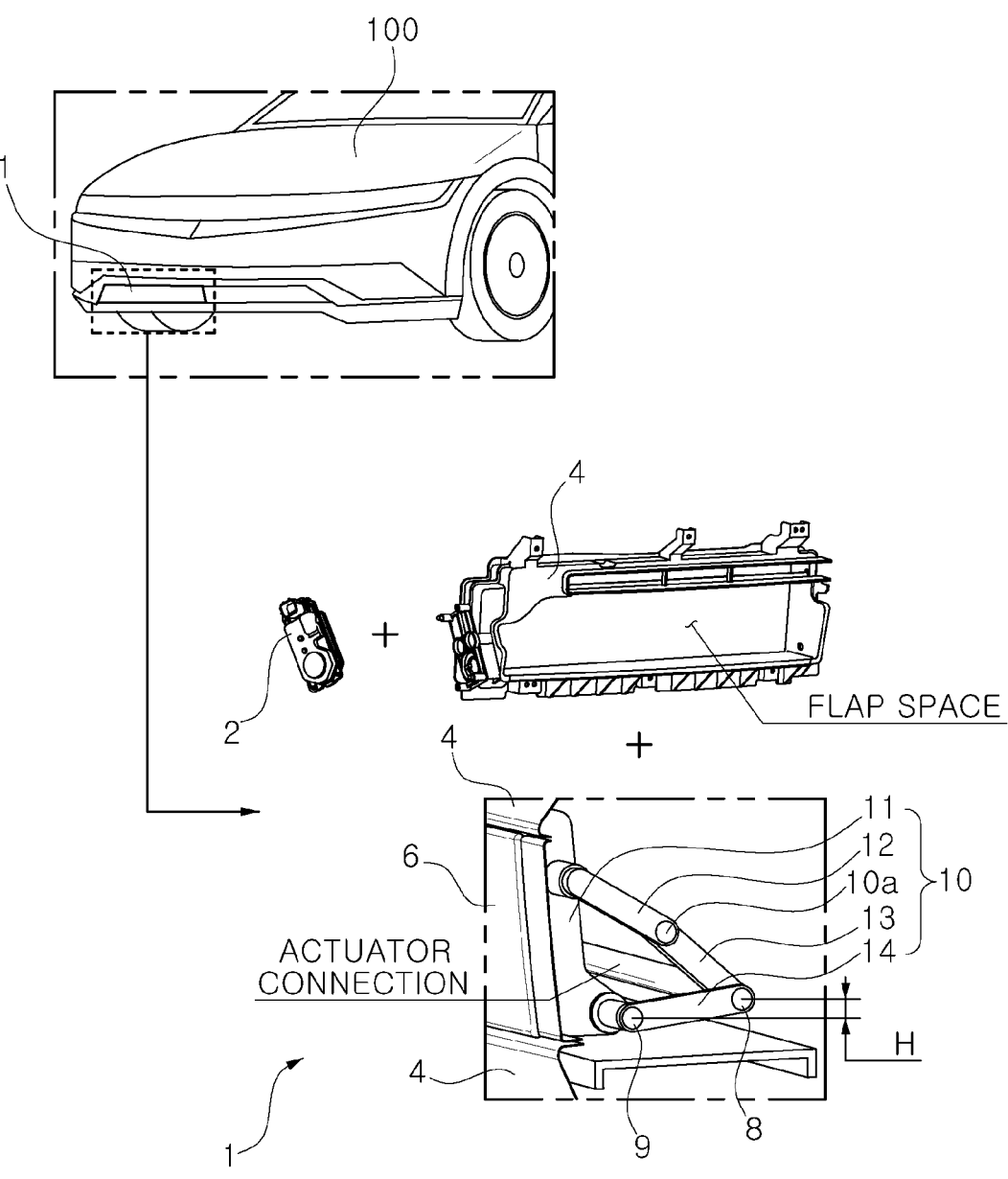
FIG. 1 is a view exemplarily illustrating a configuration of a flap automatically-locking active air flap apparatus according to an exemplary embodiment of the present disclosure which is used in a vehicle.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

An exemplary embodiment of the present disclosure is in detail described below with reference to the accompanying drawings. The exemplary embodiment of the present disclosure is exemplary and may be practiced in various forms by a person of ordinary skill in the art to which the present disclosure pertains. Therefore, the present disclosure is not limited to the exemplary embodiment described below.

With reference to FIG. 1, an active air flap apparatus 1 is mounted on a grill of a bumper lower end-portion of a front bumper of a vehicle 100 and includes an actuator 2, a housing 4, a flap 6, a driveshaft 8, a rotation shaft 9, and a four-link mechanism 10.

Configurations and operations of the actuator 2, the housing 4, the flap 6, the driveshaft 8, and the rotation shaft 9 are referred to as follows.

As an exemplary embodiment of the present disclosure, the actuator 2 is configured as a motor which is positioned on one lateral surface of the housing 4 and is combined with the driveshaft 8, and thus one section of the flap 6 is formed as a stationary section that remains fixed by obtaining force from the actuator 2. In the instant case, the actuator 2 is controlled by an AAF controller that opens or closes the flap 6 according to one of a vehicle speed, a coolant temperature, and an air conditioner pressure.

As an exemplary embodiment of the present disclosure, the housing 4 is configured as a rectangular frame forming a flap space and is mounted on the grill of the bumper lower end-portion of the front bumper of the vehicle 100 using a bolt and nut or the like. The actuator 2 is positioned on one lateral surface of the rectangular frame. Holes or grooves are formed in both lateral surfaces, respectively, of the rectangular frame and support an end portion of the driveshaft 8 and an end portion of the rotation shaft 9, respectively.

The housing 4 operates as a fourth link 14 of the four-link mechanism 10 that connects the driveshaft 8 and the rotation shaft 9 to an inside wall of the housing 4 which is opposite to the actuator 2.

As an exemplary embodiment of the present disclosure, the flap 6 includes the shape of a rectangle with a large width. The flap 6 includes a stationary section, a middle section, and a free section in the longitudinal direction thereof. The free section (that is, one portion of the flap 6) which is positioned at a longer horizontal distance from the actuator 2 than the stationary section (that is, the other portion of the flap 6) on which the actuator 2 is present and thus does not receive force is supported through the four-link mechanism 10. Thus, with a function of automatically the free section of the flap 6, a middle-section portion of the flap 6, the flap 6 including the middle section, as well as the free section on which the actuator 2 is not present, may be prevented from being forced to be open, without employing a separate locking structure.

In a state where a lower portion of the flap 6 is combined with the rotation shaft 9, a second link 12 of the four-link mechanism 10 is combined with an upper portion of the flap 6. Thus, the flap 6 operates as a first link 11.

As an exemplary embodiment of the present disclosure, the driveshaft 8 is connected to the actuator 2 and is rotated by obtaining motive power from the actuator 2. The rotation shaft 9 is connected to the lower portion of the flap 6 and is inserted into a hole or groove in the housing 4.

Therefore, the driveshaft 8 is connected to the rotation shaft 9 through the fourth link 14 of the four-link mechanism 10 in a state of being connected to a third link 13 of the four-link mechanism 10. Thus, when the actuator 2 is driven, the driveshaft 8 expands the four-link mechanism 10 which is a multi-link mechanism, closing or opening the flap 6.

A shaft height difference H occurs between the driveshaft 8 and the rotation shaft 9. The shaft height difference occurs because the driveshaft 8 is positioned at a greater height from a reference surface (that is, a button surface of the housing 4) than the rotation shaft 9. Thus, the driveshaft 8 is positioned farther from the flap 6 than the rotation shaft 9.

The four-link mechanism 10 is configured using the flap 6, the driveshaft 8, and the rotation shaft 9 on the opposite side of the actuator 2 and is made up of the first link 11, the second link 12, the third link 13, and the fourth link 14 and is positioned behind the flap 6.

As an exemplary embodiment of the present disclosure, the first link 11 is the flap 6, and the second link 12 is fixed to the upper portion of the flap 6. The third link 13 is fixed to the driveshaft 8, and thus is hinged to the second link 12. The fourth link 14 is the housing 4.

The second link 12 and the third link 13 are hinged to each other using a hinge pin 10a. The second link 12 connected to the flap 6 is rotated about the hinge pin 10a.

Figure 2:
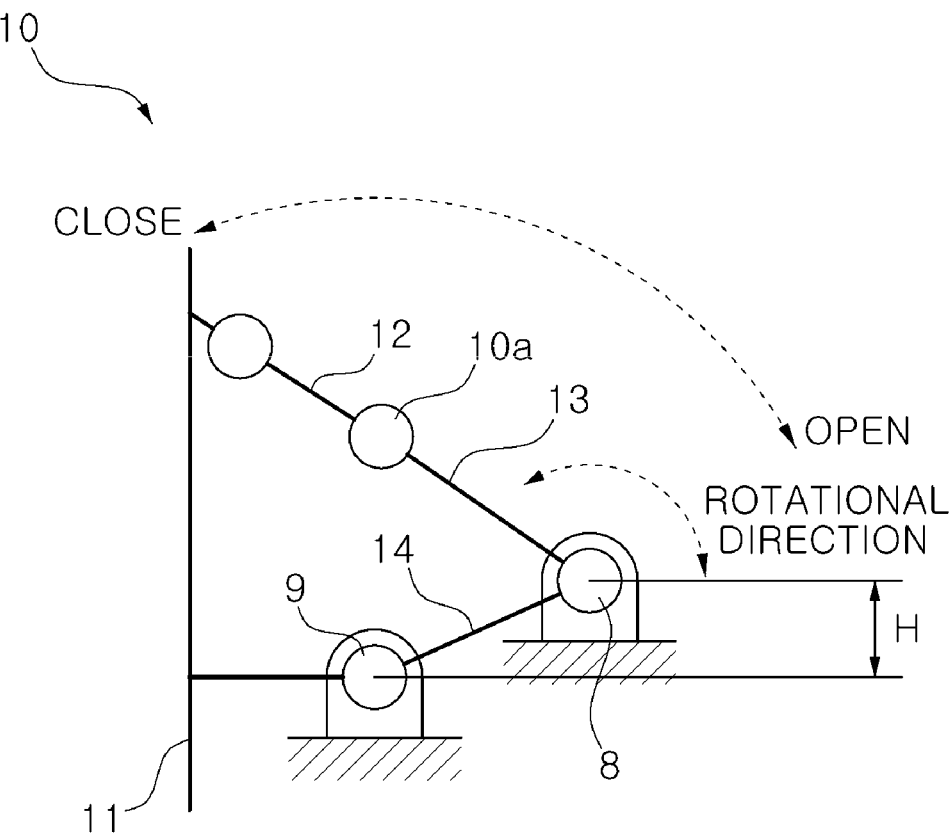
FIG. 2 is a view exemplarily illustrating that a multi-link mechanism according to an exemplary embodiment of the present disclosure is exemplified as a four-link mechanism.
Figure 3:
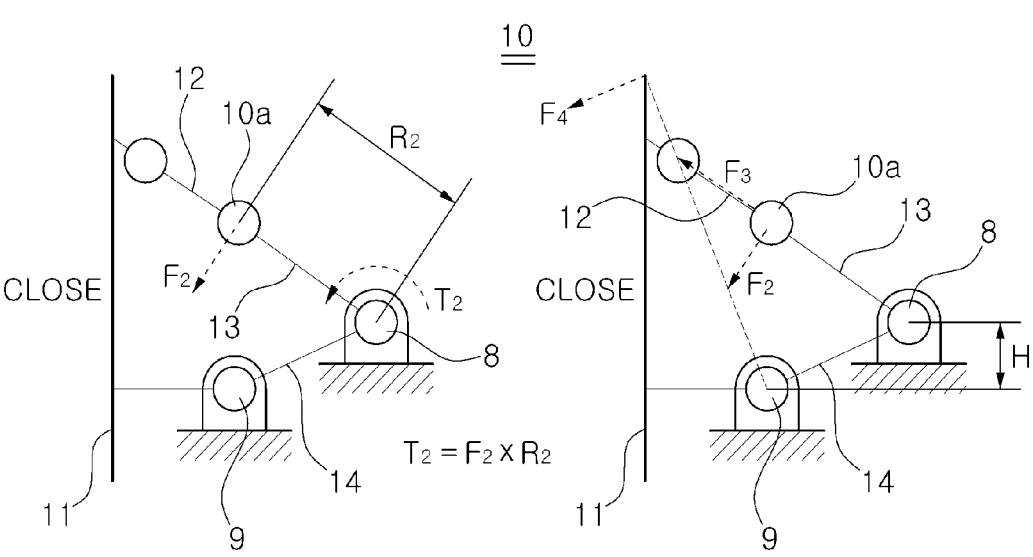
FIG. 3 is a view exemplarily illustrating that the four-link mechanism according to an exemplary embodiment of the present disclosure exerts force.
Figure 4:
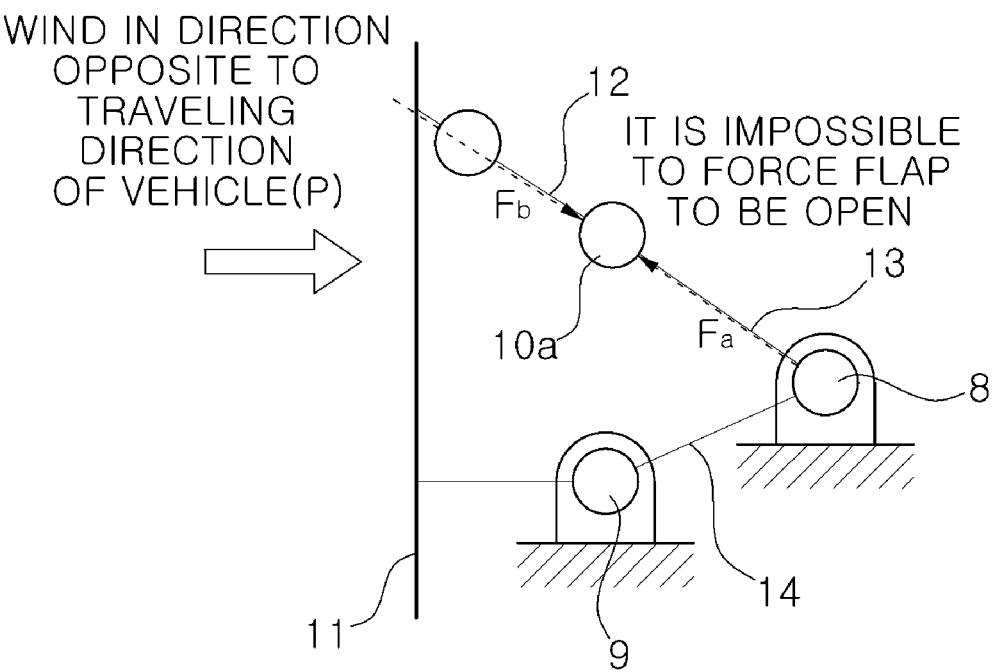
FIG. 4 is a view exemplarily illustrating a state where a flap is automatically locked due to force equilibrium which is established by the four-link mechanism according to an exemplary embodiment of the present disclosure.

FIG. 2, FIG. 3, and FIG. 4 illustrate a state where the four-link mechanism 10 is expanded by rotating the four links with respect to each other, a motor drive torque relationship, and an auto lock state, respectively.

With reference to the expanded state of the four-link mechanism 10 in FIG. 2, when the driveshaft 8 is rotated in a clockwise direction by the actuator 2, the four links are rotated repulsively with respect to each other to expand the four-link mechanism 10, and thus the flap 6 switches to an open state. Moreover, when the driveshaft 8 is rotated in a counterclockwise direction by the actuator 2, the four links are rotated in a closed manner with respect to each other to contract the four-link mechanism, and thus the flap 6 switches to a close state.

The four links are rotated repulsively with respect to each other to expand the four-link mechanism 10 in a state where the height of the driveshaft 8 is higher by the shaft height difference H than that of the rotation shaft 9. Thus, a link length R2 (refer to FIG. 3) of the third link 13 fixed to the driveshaft 8 and connected to the second link 12 is shortened by the shaft height difference H. The effect of shortening the link length R2 of the third link 13 makes it possible to employ a structure in which the flap 6 of a same size is open with less force from a drive motor.

With reference to the motor drive torque relationship in FIG. 3, the actuator 2 rotates the driveshaft 8 in the counterclockwise direction and thus rotates the four links with respect to each other to expand the four-link mechanism 10, causing the flap 6 to switch to the closed state. To rotate the driveshaft 8, the actuator 2 requires drive torque which is determined using the following equation.

$$T2 = F2 \times R2 \tag{1}$$

where "T2" depicts a motor torque of the actuator 2 which is required to rotate the third link 13, "F2" depicts third link force exerted on an end portion (that is, the hinge pin 10a) of the third link 13, and "R2" is the link length of the third link 13. In the instant case, the motor torque T2 changes according to a position at which the flap 6 operates.

In the present manner, the motor torque T2 changes so that it corresponds to the link length R2. Thus, the link length R2 of the third link 13 which is shortened by the shaft height difference H indicates that an output of the actuator 2 for rotating the third link 13 is decreased as much as the link length R2 is shortened.

The motor torque T2 generates force F2 exerted on the third link 13, force F3 exerted on the second link, and force F4 exerted on the flap 6 (that is, on the first link 11). With the force F2, the hinge pin 10a is pushed down, and thus the second link 12 and the third link 13 are rotated repulsively with respect to each other to be disposed in a straight line. With the force F3, the third link 13 is rotated to push the flap 6. With the force F4, the flap 6 is kept closed.

Therefore, when the flap 6 is closed, the force is exerted in the following order: F2→F3→F4.

With reference to the auto lock state in FIG. 4, the four-link mechanism 10 is configured to perform the auto-locking function of arranging the second link 12 and the third link 13 in a straight line to keep the flap 6 closed.

As an exemplary embodiment of the present disclosure, when a traveling wind as defined a wind in a direction opposite to a traveling direction of the vehicle 100 applies a wind pressure P to the flap 6, the auto-locking function is performed in a force equilibrium state where force at the second link 12 and force at the third link 13 that are exerted in opposite directions are canceled out at a position of the hinge pin 10a.

That is, force Fb that the traveling wind of the vehicle 100 exerts on the second link 12 to rotate the flap 6 is in a direction from the flap 6 toward the third link 13, and force Fa which is exerted on the third link 13 and prevents the actuator 2 from rotating to lock the flap 6 is in a direction toward the second link 12. Accordingly, the force Fa and the force Fb are exerted in opposite directions, and thus are canceled out, maintaining the force equilibrium state. Therefore, the flap 6, although positioned against the traveling wind of the vehicle 100, remains stationary without being rotated.

The force equilibrium state which is attained when the second link 12 and the third link 13 are disposed in a straight line is maintained until the second link 12 and the third link 13 make an angle of less than 5° with respect to the center portion of the hinge pins 10*a*.

In the present manner, the auto-locking function is performed by the second link 12 and the third link 13 so that the flap 6 is kept closed although the wind pressure of the traveling wind of the vehicle 100 which is applied to a front surface of the flap 6 exceeds a binding force of about 10 kgf which is exerted by the actuator 2 when the vehicle 100 travels at a high speed (i.e., a speed higher than a predetermined speed).

Therefore, the active air flap apparatus 1 is featured as a flap automatically-locking active air flap apparatus. Accordingly, although the size of an AAF is increased as is the case with an electric vehicle, the flap 6 is open or closed without using the actuator 2 that produces a high output. A structure of the active air flap apparatus 1 does not increase the manufacturing cost thereof and the weight thereof, when compared with that of an existing structure.

Figure 5:
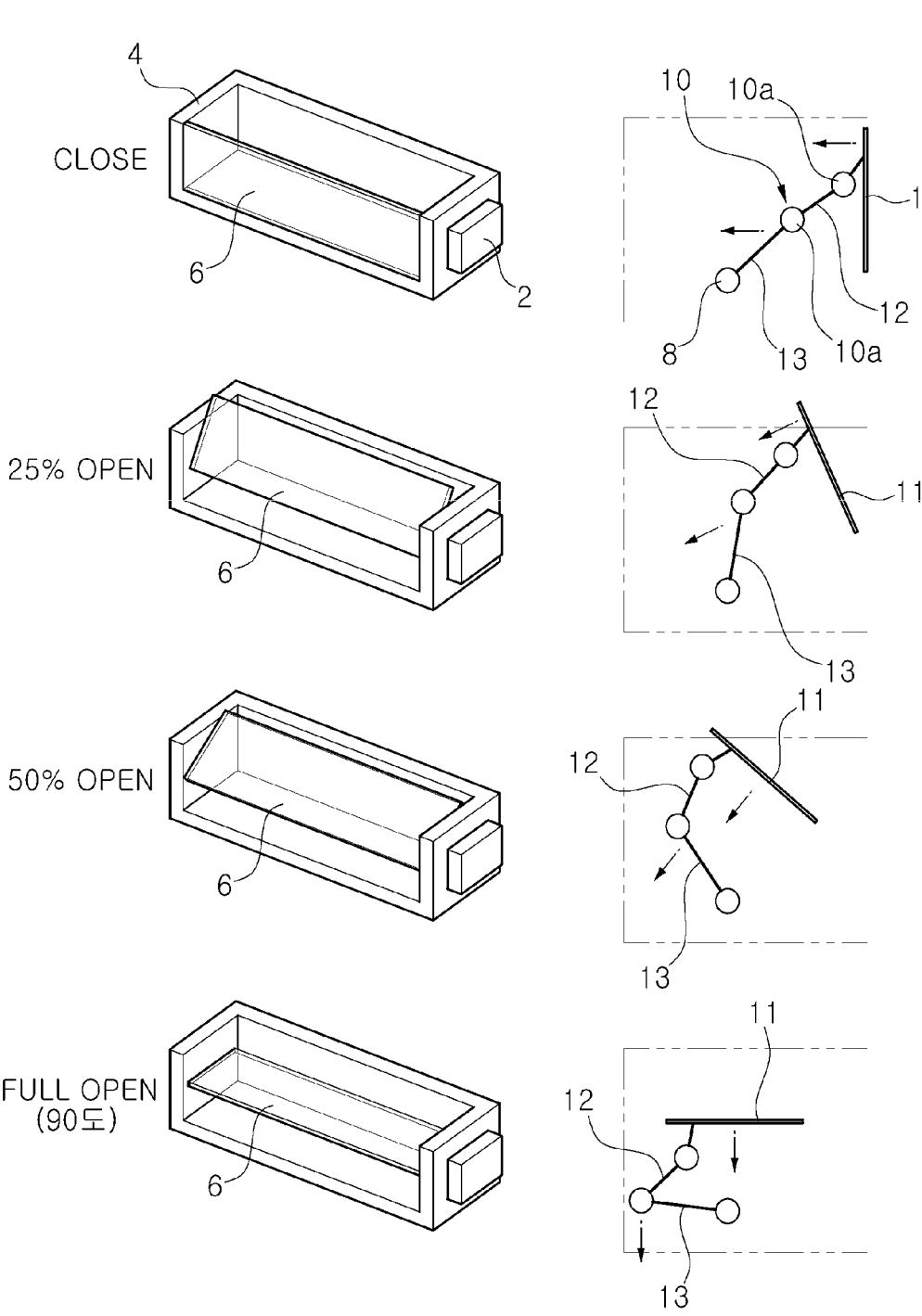
FIG. 5 is a view exemplarily illustrating a state where the four-link mechanism is expanded when the active air flap apparatus according to an exemplary embodiment of the present disclosure operates the flap so that switches from a close state to a full open state.

FIG. 5 illustrates an example where the active air flap apparatus 1 operates the flap 6 in a range of angles 0° to 90°.

As an exemplary embodiment of the present disclosure, the closed state of the flap 6 is when the flap 6 is at a 0° flap position thereof. The second link 12 and the third link 13 make an angle of less than 5°, forming a straight line or an almost-straight line. In the instant state, the flap 6 closes the flap space (refer to FIG. 1) in the housing 4, and thus the traveling wind of the vehicle 100 is not blown into the flap space.

As an exemplary embodiment of the present disclosure, a 25% open state of the flap 6 is when the flap 6 is at a 25% open position thereof. In the instant state, the third link 13 is rotated (that is, rotated in the counterclockwise direction), and thus the second link 12 is rotated inward about the hinge pin 10*a*, pulling the flap 6. Accordingly, the flap 6 is inclined at an angle of about 25° thereby opening the flap space in the housing 4, and thus, the traveling wind of the vehicle 100 is blown into the flap space.

As an exemplary embodiment of the present disclosure, a 50% open state of the flap 6 is when the flap 6 is at a 50° open position thereof. In the instant state, the third link 13 is further rotated (that is, further rotated in the counterclockwise direction), and thus, the second link 12 is rotated more inward about the hinge pin 10*a*, pulling the flap 6. Accordingly, the flap 6 is inclined at an angle of about 50°, opening the flap space in the housing 4, and thus, the traveling wind of the vehicle 100 is much more blown into the flap space.

As an exemplary embodiment of the present disclosure, a 100% (full) open state of the flap 6 is when the flap 6 is at a 90° open position thereof. In the instant state, the third link 13 is maximally rotated (that is, maximally rotated in the counterclockwise direction), and thus, the second link 12 is rotated maximally inward about the hinge pin 10*a*, pulling the flap 6. Accordingly, the flap 6 is inclined at an angle of about 90°, opening the flap space in the housing 4, and thus, the traveling wind of the vehicle 100 is maximally blown into the flap space.

As described, the flap automatically-locking active air flap apparatus 1 for a vehicle according to the exemplary embodiment of the present disclosure includes the four-link mechanism 10 that connects the driveshaft 8 rotated by the actuator 2 and the rotation shaft 9 which is separated from the driveshaft 8 and about which the flap 6 is rotated. The force Fb of the traveling wind of the vehicle 100 that rotates the flap 6 and the force Fa of the actuator 2 that locks the flap 6 are set to be exerted in different directions when the four-link mechanism 10 closes the flap 6. Thus, the auto-locking is realized in the force equilibrium state. Accordingly, the flap 6 is prevented from being open although the traveling wind of the vehicle 100 applies the wind pressure to the flap 6. With the function of automatically locking the flap 6, the actuator 2 producing the same output as an actuator in the related art is used without employing a separate structure, such as a stopper. Thus, it is possible that the manufacturing cost of the active air flap apparatus 1 and the weight thereof are decreased.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured to process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular form may also include a plural form. The expression "at least one (or one or more) of A, B, and C" may include one or more of all combinations that may be made by combining A, B, and C.

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

A singular expression includes a plural expression unless the context clearly indicates otherwise.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An active air flap apparatus comprising:
   a four-link mechanism for closing and opening a flap positioned in a flap space in a housing;
   a driveshaft coupled to the four-link mechanism and configured to be rotated to operate the four-link mechanism; and
   a rotation shaft coupled to the four-link mechanism and about which the flap is rotated,
   wherein the driveshaft and the rotation shaft are separated from each other and are connected to the four-link mechanism and the flap,
   wherein the four-link mechanism includes:
   a first link;
   a second link; and
   a third link hinged to the second link,
   wherein the second link and the third link are positioned between the flap and the driveshaft, and
   wherein the first link is hinged to the second link, and
   wherein the flap is closed when a point at which the second link and the third link intersect is on a line that connects a point where the first link and the second link intersect and the driveshaft.

2. The active air flap apparatus of claim 1, wherein the driveshaft is positioned at a greater height from a reference surface of the housing than the rotation shaft.

3. The active air flap apparatus of claim 1, wherein the driveshaft is positioned farther from the flap than the rotation shaft.

4. The active air flap apparatus of claim 1, wherein the flap is configured as the first link.

5. The active air flap apparatus of claim 1, wherein a force of a traveling wind of a vehicle that rotates the flap and a force that locks the flap are exerted, in opposite directions, on the second link and the third link, respectively, maintaining a force equilibrium state therebetween, and
   wherein in the force equilibrium state, auto-locking keeps the flap locked.

6. The active air flap apparatus of claim 1, wherein the second link and the third link are allowed to be rotated in a closed manner to form an angle of less than 5° with respect to each other.

7. The active air flap apparatus of claim 1, wherein the four-link mechanism further includes:
   a fourth link is hinged to the third link and the first link.

8. The active air flap apparatus of claim 7, wherein the housing is configured as the fourth link.

9. The active air flap apparatus of claim 1, wherein the second link is connected to an upper portion of the flap, and the third link is connected to the driveshaft.

10. The active air flap apparatus of claim 1, wherein the second link is rotated inward about a hinge pin that connects the second link and the third link.

11. The active air flap apparatus of claim 1, wherein the four-link mechanism further includes:
   a fourth link,
   wherein the first link is hinged to the second link, and the fourth link is hinged to the third link and the first link.

12. The active air flap apparatus of claim 11, wherein the flap is configured as the first link, and the housing is configured as the fourth link.

13. The active air flap apparatus of claim 11, wherein the first link and the fourth link are connected by the rotation shaft.

14. The active air flap apparatus of claim 11, wherein the third link and the fourth link are connected by the driveshaft.

15. The active air flap apparatus of claim 14, wherein the driveshaft is connected to an actuator, and the actuator is positioned on a first side of the housing and is connected to the driveshaft on a second side thereof.

16. The active air flap apparatus of claim 1, wherein the driveshaft is connected to an actuator, and the actuator is positioned on a first side of the housing and is connected to the driveshaft on a second side thereof.

17. The active air flap apparatus of claim 16, wherein the actuator is a motor.

\*    \*    \*    \*    \*